June 29, 1971  W. J. MISCAVICH ET AL  3,589,009
SPAGHETTI FORK
Filed Jan. 9, 1969
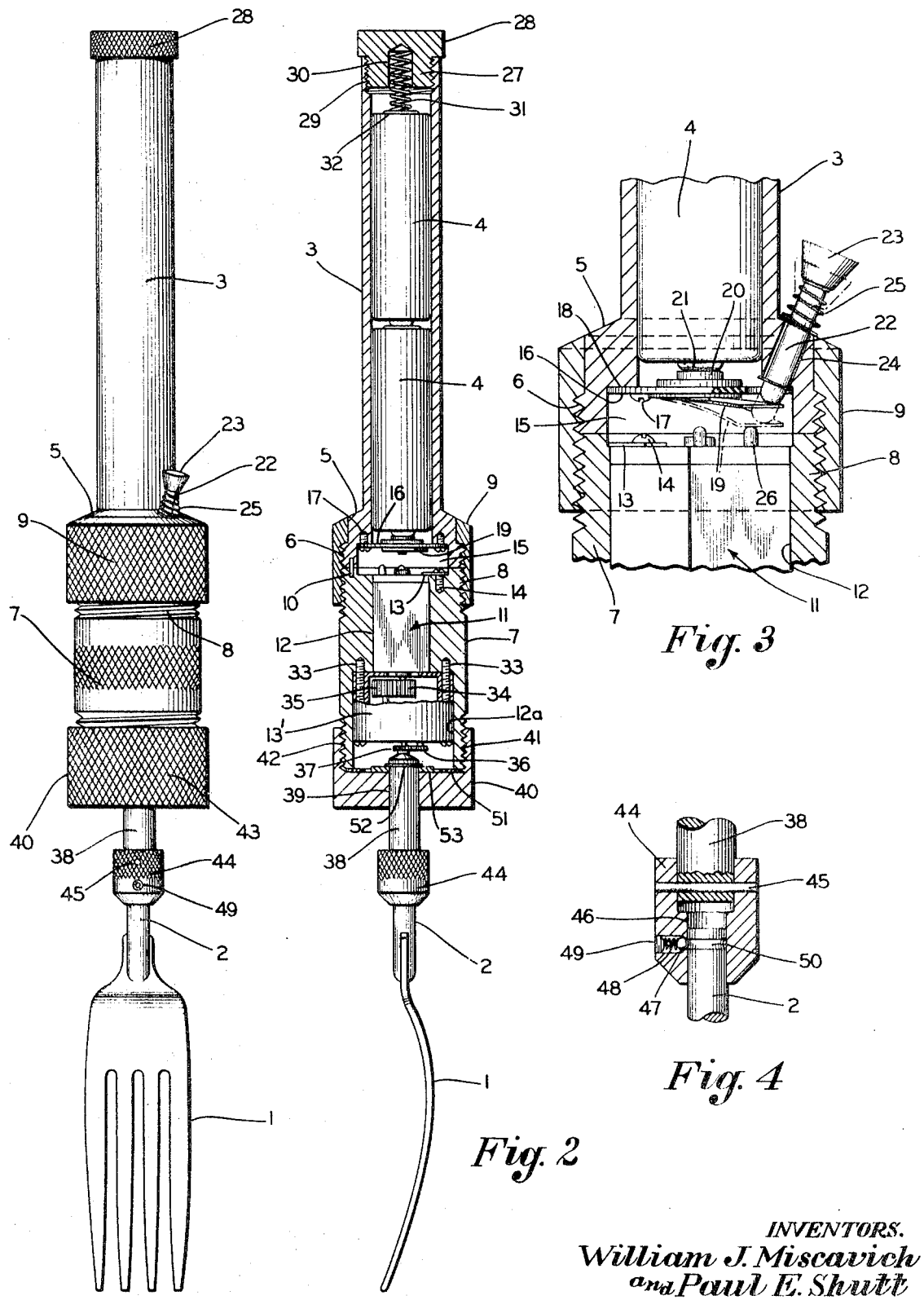
INVENTORS.
William J. Miscavich
and Paul E. Shutt
BY Frease & Bishop
ATTORNEYS United States Patent Office 3,589,009
Patented June 29, 1971

3,589,009
SPAGHETTI FORK
William J. Miscavich, Canton, and Paul E. Shutt, Strasburg, Ohio; Frances Mary Shutt, executrix of the estate of said Paul E. Shutt, deceased, assignor of a fractional part interest to Frances Mary Shutt, Strasburg, Ohio
Filed Jan. 9, 1969, Ser. No. 790,109
Int. Cl. A47j 41/28
U.S. Cl. 30—322                     2 Claims

ABSTRACT OF THE DISCLOSURE

A spaghetti fork having a tine assembly rotatable relative to the handle which is hollow. A battery operated motor is located within the hollow handle and operatively connected to the rotatable tines through a gear reduction. Switch means is provided for electrically connecting the motor to the battery.

BACKGROUND OF THE INVENTION

(1) Field of the invention

The invention relates to spaghetti forks and similar devices which are rotatable relative to the handle means and more particularly to such a device in which the fork tines or the like are rotated by a motor carried by the handle. More especially, the invention consists in a spaghetti fork or the like having a tubular or hollow handle within which is located a motor and battery means for rotating the tine assembly.

(2) Description of the prior art

It is known that revolving spaghetti forks have been proposed in which the tines of the fork were rotatable relative to the handle thereof. In one such device disclosed in Piche Pat. No. 2,602,996, dated July 15, 1952, the tines of the fork have an integral shank rotatably mounted upon the handle and have a knurled member fixed thereon by means of which it is intended that the user rotate the tines by moving his thumb or finger over said knurled member.

In Crino Pat. No. 2,710,449, dated June 14, 1955, a spaghetti fork is disclosed in which the tines are integrally connected to a flat shaft twisted into a helical screw which engages cam means in a hollow handle so that the tines of the fork may be manually rotated in the same manner as the well-known "Yankee" screw driver. However, it is not known that a motor-driven spaghetti fork has ever been proposed.

SUMMARY OF THE INVENTION

In general terms the invention may be briefly described as comprising a spaghetti fork in which the tine assembly is rotatably mounted on the handle and adapted to be rotated by means of a small battery operated motor located in or upon the handle.

Preferably the handle may be of tubular form so that it may contain the motor as well as the battery or batteries which operate the same and a gear reduction interposed between the battery and the fork per se. Switch means is provided in the handle for electrically connecting the battery to the motor.

Any usual and well-known switch means may be provided such as a toggle switch, mercury switch or the like. For purpose of illustration a pushbutton switch is disclosed. The tines of the fork are provided with a central shank portion which is operatively connected to the gear reduction means so that the tines may be rotated relative to the handle when the battery is electrically connected to the motor.

Although the shank of the fork tines may be directly connected to the gear reduction means it is preferred that a short shaft be journalled in the end of the handle and connected by gear means to the reduction gear. A chuck is mounted upon the end of this short shaft and the shank of the fork tines is shown as detachably connected to the chuck.

The primary object of the invention is to provide a spaghetti fork in which the tine assembly is rotated relative to the handle by means of a motor carried by the handle.

Another object of the invention is to provide such a device in which gear reduction means is interposed between the motor and the tines of the fork so that the tines will be rotated at proper speed for winding spaghetti or the like thereon.

A further object of the invention is to provide a spaghetti fork or the like of this type in which switch means is provided for easily and readily energizing or de-energizing the motor by the user while utilizing the fork for eating spaghetti and the like.

A still further object of the invention is to provide such a spaghetti fork in which the handle is hollow and the battery, motor and reduction gear are located within the hollow handle.

Another object of the invention is to provide a spaghetti fork or the like of the character referred to in which the tine assembly of the fork may be easily and readily removed from the handle for cleaning the tines.

The above and other objects may be attained by constructing the improved spaghetti fork in the manner hereinafter described in detail and set forth in the claims.

BRIEF DESCRIPTION OF THE DRAWING

FIG. 1 is a front elevation of a spaghetti fork embodying the invention;

FIG. 2 is a longitudinal sectional view taken at right angles to FIG. 1;

FIG. 3 is an enlarged detailed sectional view of an intermediate portion of the handle showing the switch means for electrically connecting the battery to the motor; and FIG. 4 is an enlarged longitudinal sectional view of the chuck for detachably connecting the shank of the fork.

DESCRIPTION OF THE PREFERRED EMBODIMENT

Referring now more particularly to the embodiment of the invention illustrated, the fork may comprise a tine assembly 1 of conventional construction having the usual centrally disposed shank 2.

The handle may be formed of any suitable molded or extruded plastic material, aluminum or other suitable material. The handle includes the tubular portion 3 which houses the batteries 4 which may be small size flashlight batteries. An enlargement 5 is formed at the lower end of the tubular portion 3 and is externally screw threaded as shown at 6.

The motor and reduction gear housing 7 is shown as of the same external diameter as the threaded portion 6 of the enlargement 5 and is provided with screw threads 8 at its upper end for attachment to the externally threaded enlargement 5 by means of the internally threaded sleeve 9, which, as shown in FIG. 1, is preferably knurled upon its exterior.

A pin 10 may be fixed in the opposed end of either the battery and gear housing 7 or the enlarged threaded portion 6 of the tube 3 and adapted to fit into a suitable aperture in the other member in order to properly locate the two parts when attached together.

A small electric motor, indicated generally at 11, is located within a suitably shaped cavity 12 within the motor and gear housing 7. A clip 13 connected to the housing 7 as by screw 14 limits upper movement of the motor 11 within the cavity 12.

The lower end of the cavity 12 is enlarged as at 12a to accommodate a reduction gear located within a gear housing 13'. The upper end of the gear housing 13' abuts the lower end of the motor and limits downward movement thereof.

A cavity 15 is provided in the threaded portion 6 of the enlargement 5 of the tube 3, communicating with the lower end of the interior of the tube. Switch means, which is illustrated as a push-button type switch, is located within the cavity 15 and includes an insulation disc 16 attached by screws 17 to the shoulder 18.

A flexible conductor 19 is carried by the insulation disc 16 and is in contact with the terminal member 20 which contacts the lower terminal 21 of the lowermost battery 4. A plunger 22 of suitable insulation material with enlarged head or button 23 is slidably located through a suitable aperture 24 and normally held in the full-line position of FIG. 3 by a coil spring 25. When the plunger 22 is depressed the flexible conductor 19 will be moved into contact with the motor terminal 26 as shown in broken lines in FIG. 3, closing the circuit from the batteries to the motor.

A screw plug 27, having an enlarged knurled head 28, engages the internal screw threads 29 in the upper end of the tube 3. A socket 30 in the screw plug 27 receives the upper portion of a spiral spring 31, the lower end of which engages the upper terminal 32 of the uppermost battery 4.

The gear reduction housing 13' is mounted in the cavity 12a as by screws 33. A pinion 34 on the motor shaft engages the uppermost gear 35 of the gear reduction. The lowermost pinion 36 of the gear reduction engages a gear 37 upon the upper end of a short shaft 38 journalled as at 39 in the screw cap 40. This screw cap has internal screw threads 41 which engage the external threads 42 upon the lower end of the motor and gear reduction housing 7. The screw cap 40 may be externally knurled as indicated at 43 in FIG. 1.

A chuck 44, which may be externally knurled as indicated in FIGS. 1 and 2, is connected to the lower end of the short shaft 38 as by a pin 45. This chuck has a reduced opening 46 in its lower end to receive the shank 2 of the fork. A ball 47, biased by coil spring 48 bearing against the screw plug 49, seats in the annular groove 50 in the upper end portion of the shank 2 to hold the tine assembly in place within the chuck 44.

Although the device is especially adapted for use as a spaghetti fork it should be understood that a spoon bowl or other utensil may be substituted for the fork tines 1 and integrally connected to a shank such as 2 for insertion into the chuck 44.

A gasket 51 of plastic, rubber or the like may be interposed between the lower end of the gear housing 7 and the screw cap 40. A ring 52, seated in a suitable annular groove in the upper end portion of the shaft 38 has rotatable contact with a washer 53.

THE OPERATION

In the operation of the device, the handle is held between the fingers and thumb of one hand, and as the tines 1 are inserted in a portion of spaghetti or the like the user depresses the plunger 22 to the broken line position shown in FIG. 3 by pressing a finger or thumb upon the head or button 23.

The motor is thus energized by the batteries and, through the gear reduction, the fork is rotated at the correct speed to wind spaghetti onto the tines 1 in the proper manner. When the desired amount of spaghetti has been wound upon the tines of the fork the plunger 22 is released opening the circuit to the motor and stopping rotation of the fork.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

What is claimed is:

1. A spaghetti fork including an elongated relatively small diameter tubular handle, a housing detachably connected to one end of the handle, a tine assembly or the like having a shank, means mounting said shank rotatable within one end of the housing, electric motor means carried in the housing, means operatively connecting said shank to the electric motor means, battery means carried in the tubular handle, and switch means in the housing for electrically connecting the battery means to the motor means, said switch means being located in position to be operated by a finger or thumb of a hand grasping said handle.

2. A spaghetti fork of the character defined in claim 1 in which a short shaft is journalled in the end of the motor housing, means operatively connects said shaft to the motor, and a chuck is mounted on the end of said shaft for detachably receiving the shank of the tine assembly.

References Cited

UNITED STATES PATENTS

| | | | |
|---|---|---|---|
| 2,841,869 | 7/1958 | Levine | 30—322 |
| 3,183,538 | 5/1965 | Hubner | 310—50X |
| 3,420,250 | 1/1969 | Holmes | 310—50X |

ROBERT C. RIORDON, Primary Examiner

J. C. PETERS, Assistant Examiner